Feb. 8, 1949.  A. G. PERKINS  2,461,439
ALARM DEVICE FOR MILKING MACHINES
Filed June 23, 1944  2 Sheets-Sheet 1
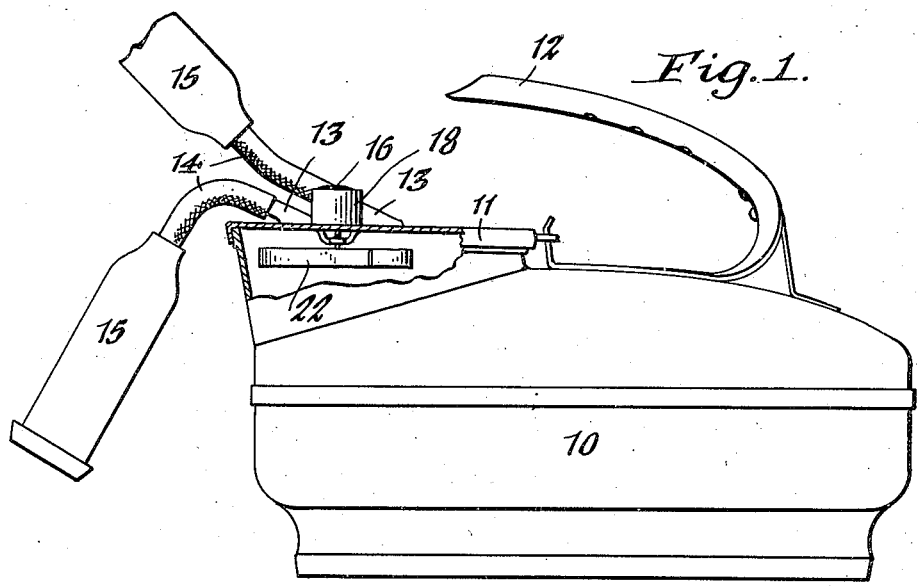
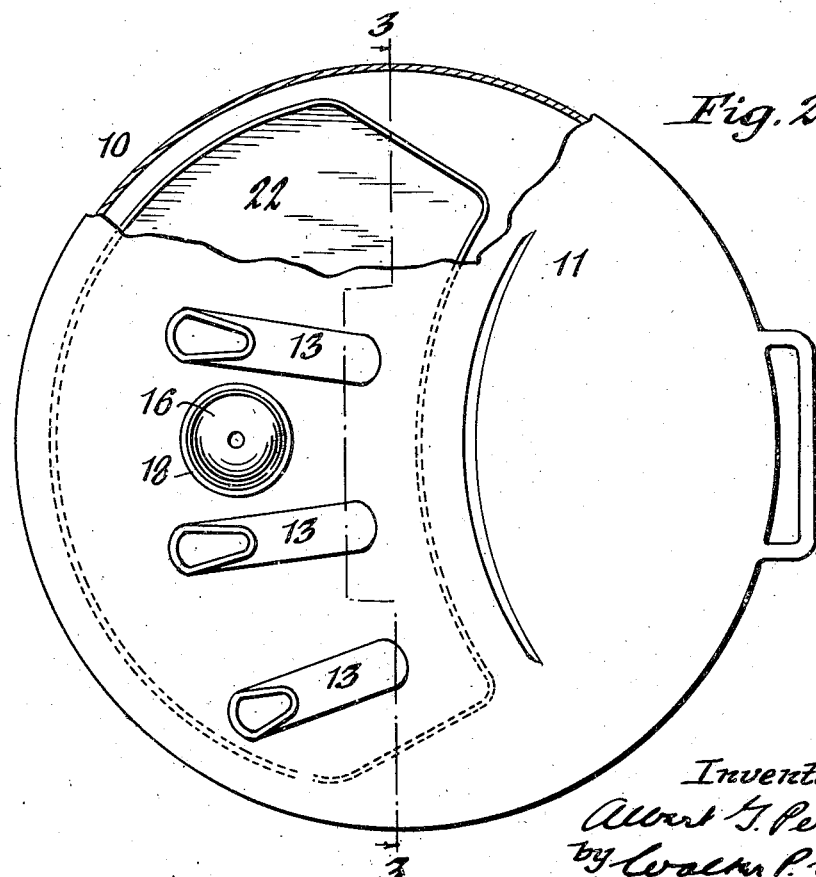

Feb. 8, 1949.　　　　A. G. PERKINS　　　　2,461,439
ALARM DEVICE FOR MILKING MACHINES
Filed June 23, 1944　　　　　　　　　　　2 Sheets-Sheet 2

Inventor,
Albert G. Perkins.
by Walter P. Geyer
Attorney.

Patented Feb. 8, 1949

2,461,439

UNITED STATES PATENT OFFICE 2,461,439

ALARM DEVICE FOR MILKING MACHINES

Albert G. Perkins, Warsaw, N. Y.

Application June 23, 1944, Serial No. 541,681

8 Claims. (Cl. 31—58)

This invention relates to certain new and useful improvements in warning signals or alarm devices for use on milking machines for indicating when the cow has been milked out or when the danger period has been reached in the milking operation.

One of its objects is to provide a device of this character which is rendered operative to give an alarm when the flow of milk from the cow is reduced to a minimum and which alarm will continue to blow until the flow of the milk ceases, thereby indicating to the attendant that during the operation of the alarm, the milking machine should be disconnected.

Another object of the invention is to provide a signal appliance for milking machines which is so designed and correlated with the flow of the milk delivered into the can that it will also become operative to sound the alarm when the amount of the milk delivered to the can reaches a predetermined level.

A further object is the provision of a milk-flow governed signal device which can be readily applied to milking machines and which is responsive to the vacuum employed in the operation of such machines, including a valve means which serves a dual function of governing the breaking of the vacuum as well as governing the signal device and thereby assuring proper control of the vacuum at all times and the proper operation of the system.

Other features of the invention reside in the construction and arrangement of parts hereinafter described and particularly pointed out in the appended claims.

Figure 3:
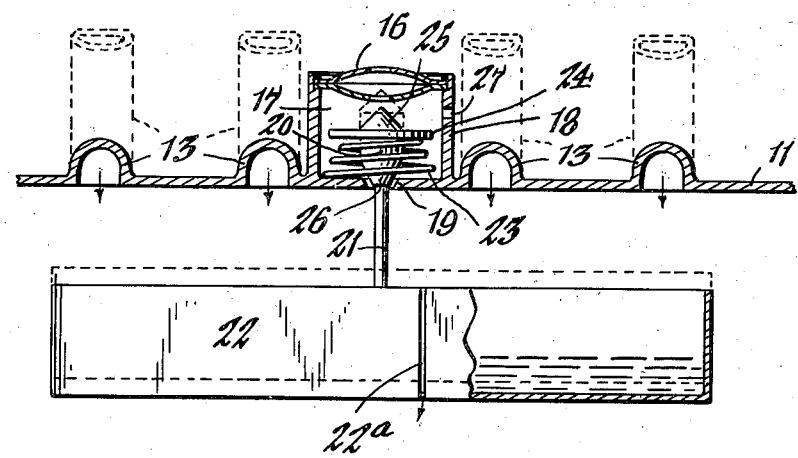
Figure 4:
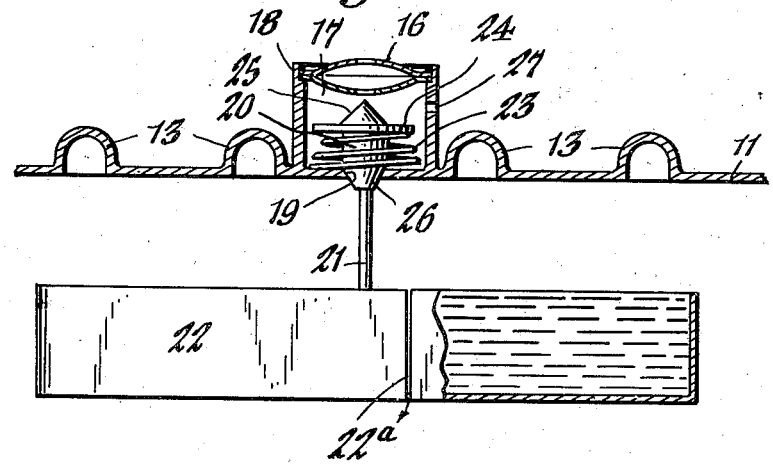

In the accompanying drawings:

Figure 1 is a sectional side view of the milk-receiving can and associated parts of a milking machine showing my alarm or signal device applied thereto. Figure 2 is an enlarged top plan view, partly in section, of the can-cover and associated parts embodying my invention. Figure 3 is an enlarged fragmentary cross section taken in the plane of line 3—3, Figure 2, showing the alarm device in its operative position. Figure 4 is a similar view showing the device in its inoperative position, as during the normal flow of milk from the cow.

Similar characters of reference indicate corresponding parts throughout the several views.

By way of example, I have shown my signal or alarm device applied to a milking machine of ordinary construction, 10 indicating the milk-receiving can having an operating top or cover 11 detachably applied to its upper end and adapted to be held firmly and tightly thereto by the vacuum employed in the milking operation. A handle or bail 12 is provided for facilitating its handling as well as for suspending it from the cow during the milking operation. Radiating from the top of this cover are intake tubes 13 by which the milk is delivered to the can, these tubes being individually connected by companion flexible conduits or connections 14 having teat cups 15 at their free ends for detachable connection to the cow's teats.

For the purpose of preventing injury to the cow by leaving the milking machine on for too long a period, I provide a signalling or warning device which will be automatically rendered operative at predetermined times during milking operation and particularly at a time when the milk delivered by the machine is reduced below its normal rate of flow. While my improved device may be mounted in any appropriate place on the can 10 where it is in the path of flow of the milk delivered through the tubes 13, it is by preference mounted on the cover 11 in the manner shown in Figures 3 and 4 of the drawings. The signalling or alarm device is preferably in the form of a whistle 16 adapted to be actuated when in communicating relation with the vacuum in the system, the whistle being removably seated in the upper end of a chamber 17 provided by a tubular collar 18 rising from the cover substantially centrally of the group of intake tubes, the bottom of this chamber having a port 19 therein opening into the can 10. A signal or alarm control element in the form of a valve 20 is disposed in this chamber for movement axially thereof toward and from the whistle and port to accordingly render the whistle operative or inoperative. This valve is applied to the upper end of a stem 21 suitably guided on the cover and extending through the port 19 and provided at its lower end with a receptacle 22 which may be shaped in plan as seen in Figure 2, so as to register collectively with the tube-intakes 13 to receive the milk extracted by the machine from the cow. A drain opening 22ª, which may be in the form of a slit, is formed in the side of the receptacle. A spring 23 applied to this stem and bearing at its upper end against a collar 24 fixed thereon and at its other end against that portion of the cover surrounding the port 19 serves to normally urge the valve and its receptacle to an elevated position shown by dotted lines in Figure 3 and in which position the whistle is closed to render it inoperative.

The valve 20 is preferably in the form of a duplex valve to alternately open and close the whistle 16 and port 19 in response to the gradual lowering or elevating of the receptacle 22, to the end that the whistle will be rendered operative during that portion of the milking operation when the flow of milk delivered to the can is reduced below its normal rate of flow, and will eventually be rendered inoperative or cease blowing when the receptacle reaches its maximum position of elevation. Incidentally, because of this valve control of blowing the whistle only over a given period of time, it will also blow or be operative at the start of the milking operation. Should the can become too full during the normal milk flow period, the whistle will also be rendered operative by reason of the float-actuated elevation of the receptatcle. At its upper end this valve 20 has a conical-shaped face portion 25 which is adapted to cooperate or seat against the opening in the whistle, while at its lower end this valve has a like-shaped face portion 26 which is adapted to cooperate or seat against the port 19. Normally the spring 23 urges the valve upwardly to bring its face 25 into seating engagement with the opening in the whistle, while its lower face 26 is moved to a position remote or unseated from the port 19, in which position of the parts the whistle is rendered inoperative.

As the milk starts to flow into the can from the tubes 13, it is intercepted by the receptacle 22 and at a predetermined time the receptacle is caused to gradually lower to unseat the upper valve-face 25 while the lower valve-face 26 is still unseated, thereby causing the whistle to blow. Gradually the receptacle is lowered during the milking operation and the lower valve-face 26 is seated against the port 19 to shut off the vacuum to the chamber 17 and render the whistle inoperative. As soon as the flow of milk is reduced below its normal rate of flow, the milk in the receptacle 22 is discharged through its drain opening 22ª at a faster rate than that delivered by the machine, and at a predetermined time the spring 23 will cause the receptacle to be gradually elevated and accordingly lift the lower valve-face 26 from engagement with the port 19 and initiate the operation of the whistle, thereby indicating to the operator that the milking machine should be shut off. When the milk is completely drained from the receptacle, the top face 25 of the valve 20 will seat itself against the whistle and shut it off. It will be understood that the normal flow of milk to the can is greater than the rate of discharge of the milk from the receptacle.

If desired, the collar 18 may be provided with a vent 27 for reducing the vacuum in the valve chamber to thereby facilitate the movement of the valve to a position to close the whistle. This vent is small and will not disturb the vacuum in the system.

I claim as my invention:

1. A device of the character described, comprising a body having a chamber formed therein and a valve-controlled port at one end thereof, a vacuum-operated alarm device fitted in said chamber, a stem extending through said port for movement axially thereof and having valve portions at its upper end in operative relation to and between said alarm device and said port, a spring applied to said stem for normally urging it in a direction to bring one of its valve portions into valve-closing relation with the alarm device and its other valve portion into valve-opening relation with said chamber-port, and a receptacle applied to the lower end of said stem and having a drain passage therein.

2. In a milking machine, a can-engaging cover having a vent port therein, an alarm device consisting of a whistle disposed in communicating relation with said port and operative by the vacuum employed in the milking operation, and flow control means in communication with the milk drawn by the machine and in governing relation with said port and said alarm device for rendering the same operative or inoperative at predetermined stages in the milking operation, said means including a yieldingly suspended receptacle having a drain opening therein and a double-ended valve member disposed between the alarm device and the port and operable in response to the movements of the receptacle to control such parts.

3. In a milking machine, a pneumatically-operated alarm device having a port communicating therewith and operated by the vacuum in the milking operation of the machine, a double-ended valve operatively interposed between said alarm device and said port and movable to and from alternate opening and closing positions relative to such parts, a spring for normally urging said valve to a closed position in relation to the alarm device and to an open position relative to the port, and a milk-receiving receptacle connected to said valve and governed by the rate of flow of milk delivered by the machine to initiate the actuation of said valve to a closed position in relation to said port and to an open position relative to said alarm device, said receptacle having a drain opening therein.

4. The combination with a milking machine having a can-engaging cover, of a chamber-forming member applied to said cover having a port therein opening into the can, a vacuum-operated whistle in the upper end of said chamber, a stem suspended from the cover in axial alinement with its port and whistle for displacement relative thereto and provided at its upper end within said chamber with a dual valve for controlling the whistle, the valve having a face at its upper end for opening and closing the whistle and a face at its lower end for opening and closing the port, a spring applied to said stem for normally urging the valve in a direction to bring it into closed relation with the whistle and into open relation with the port, and a milk-receiving receptacle having a drain-opening therein mounted on the lower end of said stem for receiving the milk drawn by the machine to thereby gradually lower said stem to cause the valve to open the whistle and thereafter close the chamber-port, said receptacle being gradually elevated during the drainage of the milk therefrom at a predetermined stage in the milking operation to cause the valve to open the chamber-port and thereafter close the whistle.

5. In a device of the character described, a cover for a fluid-receiving can having a port therein and a chamber about and in communication with such port, a vacuum-operated alarm device in said chamber in spaced relation to said port, a double-headed valve in said chamber in controlling relation to said port and said alarm device, a spring operating on said valve to urge it upwardly to successively open the port and close the alarm device, and a fluid-receiving receptacle connected to said valve for urging it downwardly to successively open the alarm device and close the port.

6. The combination with a vacuum milking machine, of a receptacle adapted for suspension from the cover of a milk-receiving can in communication with the flow of milk thereto and from which receptacle the milk is discharged at a predetermined rate during the milking operation, a yieldingly suspended member guided on said cover and rising from the receptacle for elevating it when substantially empty and having a signal control element thereon, and a signal device in operative governed relation to said suspended member and rendered operative by the signal control element thereof for an initial period subsequent to the start of the milking operation and for a predetermined period during such time that the flow of milk delivered by the machine is less than the rate of discharge of the milk from the receptacle, said signal device being rendered inoperative by the signal control element of said member when the receptacle is substantially drained of its milk content.

7. In a device of the character described, a fluid-receiving can having a port therein and a chamber about and in communication with such port, an alarm device, a double-ended control element in said chamber in governing relation at one end with said port and at its other end with said alarm device, means for constantly urging said control element to a position to open said port and render the alarm device operative, and a fluid-receiving receptacle suspended from said control element for actuating it in the opposite direction to render the alarm device inoperative and close the port.

8. In a device of the character described, a fluid-receiving can having a port therein and a chamber about and in communication with such port, a vacuum-operated alarm in said chamber, a receptacle suspended in said can to intercept the liquid introduced thereto and from which receptacle the liquid is discharged at a predetermined rate, an alarm-governing suspension member rising from the receptacle and guided for vertical movement relative to the can and provided at its upper end with a valve disposed in said chamber and movable toward and from closing relation with its port, and resilient means acting on said suspension member for constantly urging the receptacle and the valve to an elevated valve-opening position to render the alarm operative, the receptacle together with its fluid-contents tending to urge the suspension member in the opposite direction to its valve-closing position to render the alarm inoperative.

ALBERT G. PERKINS.

REFERENCES CITED

The following references are of record in the file of this patent:

UNITED STATES PATENTS

| Number | Name | Date |
|---|---|---|
| 2,321,616 | Perkins | June 15, 1943 |